V. F. PAVEY.
CORN PLANTER.
APPLICATION FILED JAN. 18, 1908.

945,728.

Patented Jan. 4, 1910.

2 SHEETS—SHEET 1.

WITNESSES:

INVENTOR.

BY

ATTORNEY.

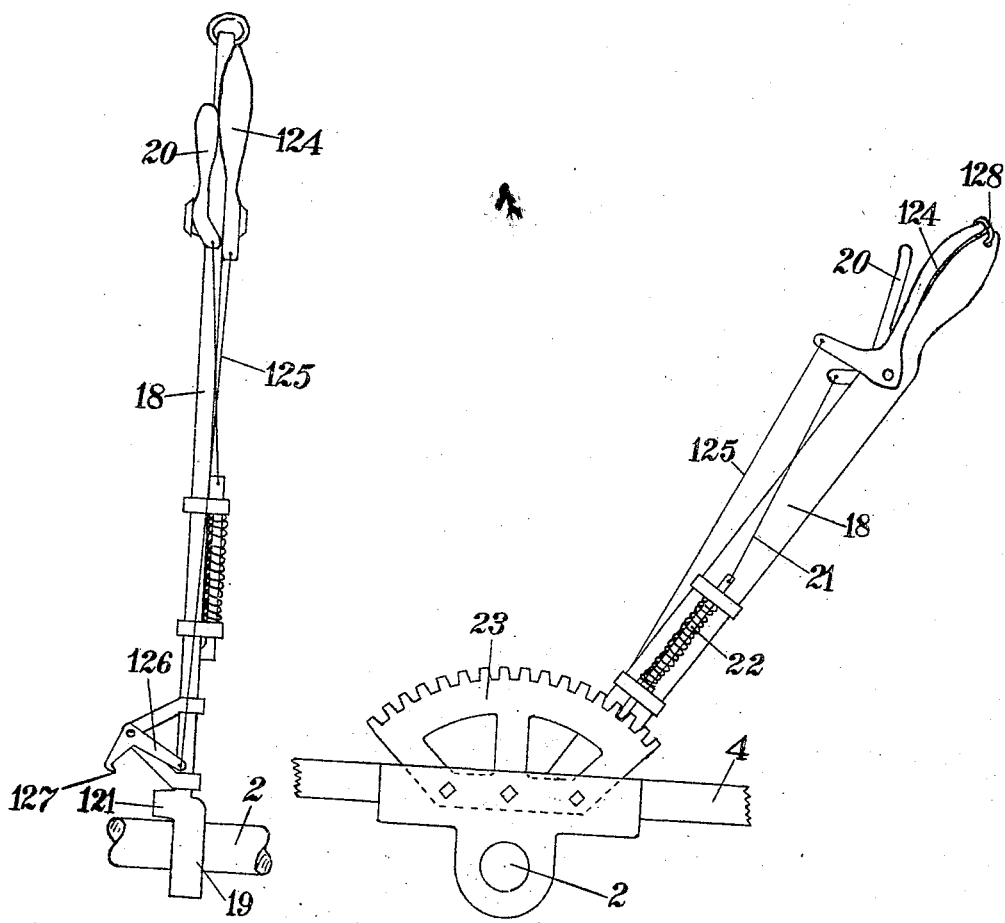

UNITED STATES PATENT OFFICE.

VERNON F. PAVEY, OF LEESBURG, OHIO.

CORN-PLANTER.

945,728.  Specification of Letters Patent.  Patented Jan. 4, 1910.

Application filed January 18, 1908. Serial No. 411,516.

*To all whom it may concern:*

Be it known that I, VERNON F. PAVEY, a citizen of the United States, residing at Leesburg, in the county of Highland and State of Ohio, have invented certain new and useful Improvements in Corn-Planters, of which the following is a specification.

My invention relates to improvements in corn planters and consists in certain devices for tripping the dropper at any desired point in the revolution of the wheel of the planter, and for actuating the dropping disk at intervals. These various devices are actuated by a tripping device mounted on the wheel, which at fixed points in the revolution thereof engages levers appropriately mounted to accomplish these purposes; these devices will be hereinafter described and claimed.

It has been usual in the operation of corn planters, to require the use of a wire adapted to be stretched across the field in the direction of the travel of the planter, said wire having tripping knots thereon at determined intervals for the purpose of causing the seed to drop at such points. The wire is required to be secured at its ends at each side of the field, and the operator is forced to dismount at the end of each row and move the wire a distance corresponding to the distance between adjacent rows. This dismounting and moving of the wire takes place at each end of each row, and consequently occupies a great deal of time and labor and thereby decreases the efficiency of the machinery and the laborers employed. Further, in case the ground should contain trees or stumps, it frequently happens that it is necessary to sever the wire, and then when the planter has passed around the obstructing tree or stump the wire is again inserted through the dropping device, and the severed ends of the wire are thereupon joined; the dropping or planting may then proceed to the end of the row unless another obstruction of a similar nature should be encountered.

On account of the inconvenience and loss of time and consequent expense entailed by the use of the wire dropping device, I have devised my improvements, which provide devices for planting the grain which can be operated and controlled completely by the operator from his seat on the planter; and at the end of each row or at any point in the row, as desired, the operator may shift the dropping device to cause the grain to be planted at a longer or shorter interval. All these devices may be controlled by hand or foot by the operator quickly and easily without any loss of time or labor attendant upon the manipulation of the well known wire dropping device.

Figure 1:
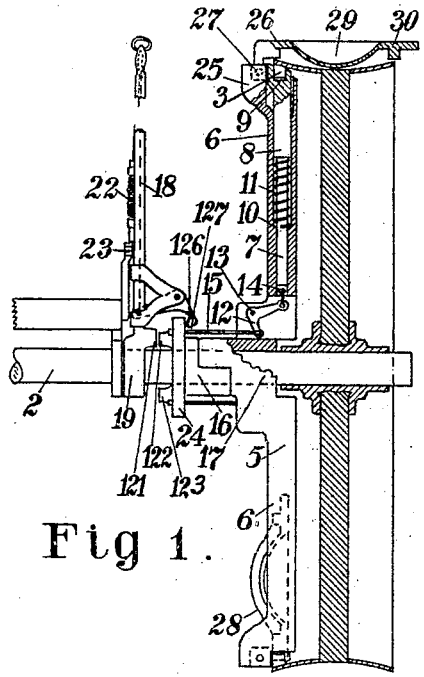
Figure 3:
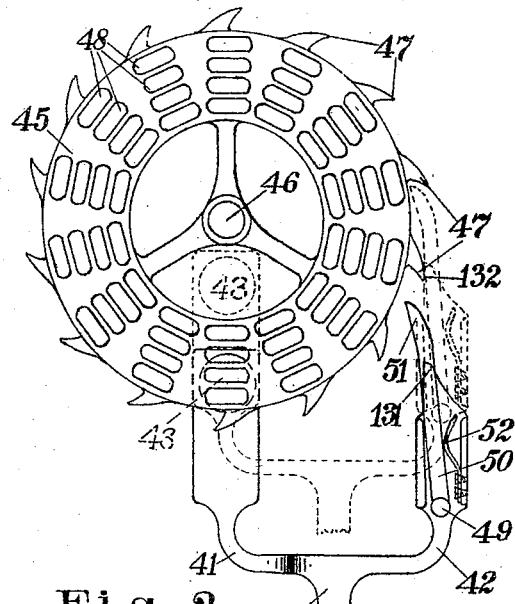
Figure 2:
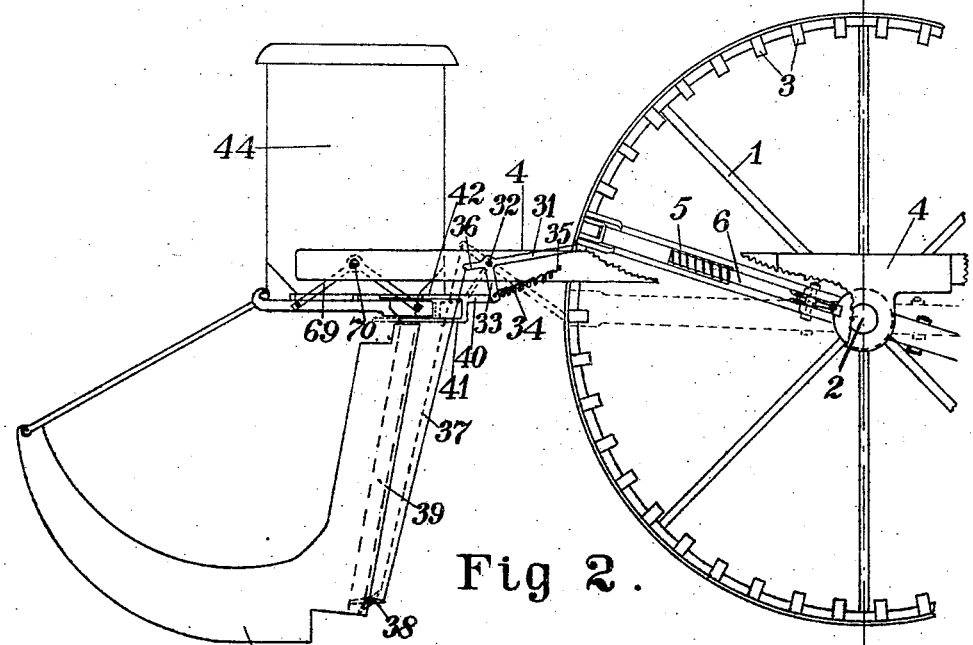

Referring to the drawings which are hereto attached and hereby made a part of this specification, Figure 1 is a vertical transverse section through the bearing wheel and its associated devices; Fig. 2 is a side view partly in section of a wheel and seed box and the connections between the wheel and the dropper; Fig. 3 is a plan view and shows means for actuating the seed disk, and controlling the dropping of the seed therethrough; Fig. 4 is a front view of the actuating lever and Fig. 5 is a side view thereof.

I have not deemed it necessary to show in the drawings or to describe herein, a complete corn planter, for the reason that sectional or partial views of a planter are sufficient to illustrate the construction and use of my improvement; it is believed that the connection of the parts shown with parts not shown is sufficiently obvious to all persons who are familiar with corn planter constructions.

Referring to the drawings in which the same numeral indicates the same part throughout, 1 is a wheel of a corn planter mounted upon the axle 2, and provided around its circumference with the projections or lugs 3; at 4 is shown a portion of the corn planter frame broken away to show the tripping device, and continued to show the means of mounting the dropper. A tripping construction 5 is mounted on the axle 2 adjacent the wheel, and extends diametrically across the wheel as appears clearly in Fig. 1. It comprises the hollow frame member 6 having positioned therein a rod 7, said rod at its outer end being provided with the enlargement 8, which is cleft or bifurcated as shown at 9 to receive one of the lugs 3 mounted on the inner face of the wheel rim. The hollow frame 6 is provided at 10 with a shoulder, and the rod 7 is provided with the spring 11 which at one end engages against the enlargement 8 of the rod 7 and at its other end engages against the shoulder 10; the purpose of the spring is to maintain the cleft portion 9 of the rod 7 in engagement with the lug 3. Adjacent the axle the frame member 6 is provided with the bell crank lever 12, pivoted at 13, one arm of which is connected with the end of the rod 7 at 14, the other arm of said bell crank lever having secured thereto a link 15, which is connected to the clutch member 16 mounted upon the axle 2 adjacent the tripping construction. The construction of the tripping device shown in full line at 6 on the opposite side of the axle is identical with that just described and shown in Fig. 1, and therefore does not require additional description. It is seen that the tripping construction is mounted on the axle at the hub 17, and is rotatable thereon independently of the wheel, when the rod 7 is out of engagement with the lug 3. This construction renders it possible to turn the tripping member at will and fix the same at any point desired by engaging the rod with a preferred lug on the wheel rim; this is readily done as the tripping construction is made as light in weight as possible consistent with its function. The spring mounted rod 7 is controlled through the bell crank lever and link just described, by means of the hand lever 18, which is mounted upon the axle 2 at 19, where it is in convenient reach of the operator who is seated upon the planter frame in the usual manner. The hand lever 18 (see Figs. 4 and 5) carries the pivoted finger 20 thereon, to actuate the connecting rod 21 to lift the spring controlled bolt 22 out of engagement with the segmental rack 23 and the lever 18 may then be oscillated in either direction. Lever 18 has a lug 121 adapted to engage one of the lugs 122, 123, on the clutch 16 to rotate said clutch and hub member 17 to rotate the tripping device 5. The clutch 16 is moved outwardly as follows: Lever 18 carries the pivoted finger 124, having the connecting rod 125 connected thereto to actuate the pivoted bell crank 126 provided at its outer end with the hook 127 adapted to engage shoulder 24 on the clutch 16 and draw the same away from the wheel, thereby withdrawing the rod 7 out of engagement with the lug 3, and freeing said tripping device. When the clutch 16 is drawn away from the wheel in this manner, one of the lugs, 122, 123 is properly positioned for engagement with the lug 121, and as the lever 18 is oscillated the tripping device is rotated through the lug and clutch members just described.

When the tripping device is in position to engage the desired lug 3 on the wheel rim, the finger 124 is released by the operator and the engagement is thereby effected, and upon the release by the operator of the finger 20 the bolt 22 engages the rack 23, and the parts are ready for operation.

When it is desired to move the planter from place to place without using the dropping means, I retract the finger 124 and drop over it the ring 128 on the lever 18, to hold the tripping device out of engagement with the wheel rim, whereupon it remains stationary so long as desired. The hand lever 18 is positioned conveniently for the operator, and, as described, places the tripping device completely under the operator's control, and on account of its construction, the said tripping device may be quickly operated at will.

Mounted on a hollow frame member 6 on an enlargement 25 thereon adjacent to its outer end is the marker 26; this is pivotally mounted at 27, and may be swung out of position as shown at 28. Its function is to indicate the location of a hill or the spot where seed is planted, and it has the central concave portion 29 surrounded by the flange 30, which makes an impression in the soft earth, leaving a cup-shaped hillock or mound over the seed. The use of this device enables the operator to make the rows straight. It need not be further described herein as it is the subject of Letters Patent of the United States, Number 925,375, issued June 15, 1909.

The enlargement 25 on the tripping member 6 during the revolution of the wheel 1 engages with an arm 31 of the bell crank lever pivoted at 32, and thereby trips said lever; to the arm 33 of the bell crank lever is secured one end of the spring 34, which at its other end is secured to the frame 4 of the planter at 35. The tripping of said bell crank lever performs two functions, namely, through the arm 36 and the connecting rod 37, the valve 38 adjacent the lower end of the dropping tube 39 is opened so that the grains of corn lodged therein upon said valve are released and may drop downwardly into the earth. Inasmuch as the tripping device 5 actuates the bell crank lever 32 with each of its ends in one revolution of the wheel, the result will be that two hills of corn are discharged at each revolution of the wheel. It is however, apparent that a tripping device with more than two arms may be provided, and the number of hills discharged during each revolution of the wheel may be increased as desired. However, I have shown only two arms for the tripping device, which number I regard as preferable, although I do not intend to limit my construction to that number. The tripping of the bell crank lever 32 also produces another effect, namely, through the arm 33 the dropping frame plate 40 is actuated forwardly, and after the tripping device passes off the arm 31 of the bell crank lever 32, the lever is retracted by the spring 34, which accordingly causes the valve 38 to return to its closed position, and returns the dropping frame plate 40 to the position shown in full line in Fig. 2.

The dropping frame plate 40 is shown in full line and also in dotted line in its innermost position in Fig. 3, by reference to which it is seen that said plate carries two arms 41 and 42, the arm 41 being bent to occupy a lower plane than the arm 42 which appears very clearly also in Fig. 2. As seen, the arm 41 is provided with an opening 43 therethrough, which normally lies at the upper end of the dropping tube 39 and is in register therewith, whereas in the inner position of said arm 41 the opening 43 is out of register with said tube 39. To prevent the rotation of the disk 45 too far, I provide the extension 131 on the arm 42 to engage the face of the advance tooth 47, as shown in dotted lines at 132 in Fig. 3. The features of this part of my improved corn planter need not be further described herein as they are made the subject of a separate application, Serial No. 472,708, filed January 16, 1909.

The furrow into which the corn is dropped is made by the furrow opener 68, which is secured to the frame of the machine by means of the angular strap 69 mounted at 70 upon frame 4 of the planter. It is seen that the dropping tube and seed box and seed disk are supported upon the frame work suspended from the strap 69 and are adapted to be removed therefrom readily whenever occasion demands.

All of the devices herein described are under the control of the operator from his seat on the planter and it is unnecessary to dismount to control or adjust the various operating parts. My improvements render the use of a wire stretched across the field in the direction of the planter entirely unnecessary, and frequent stopping and repairs and readjustments of the wire consequent upon the use of the same are all avoided by my construction.

What I claim is:

1. In a seed planter, a frame mounted on wheels, a grain dropping device mounted on said frame, a tripping member for said grain dropping device loosely mounted adjacent to a wheel, spring operated means for connecting said tripping member to said wheel at any desired point in the circumference of said wheel, and hand operated means for disconnecting said tripping member from said wheel.

2. In a seed planter, a wheeled carriage having a frame thereon, a grain dropping device mounted on said frame, a tripping member for said grain dropping device loosely mounted on the axle of said carriage adjacent to a wheel, means for connecting said tripping member with said axle to rotate therewith, and resilient means for connecting said tripping member with said wheel at any desired point upon the rim of said wheel to determine the interval at which said dropping device shall be actuated.

3. In a seed planter a wheeled carriage having a frame mounted thereon, a grain dropping device mounted upon said frame, a tripping member for said grain dropping device mounted loosely upon the axle of said carriage adjacent to a wheel, means for connecting said tripping member with said axle to rotate therewith, lugs at desired intervals on the rim of said wheel, resilient means carried by said tripping member for connecting said tripping member with a preferred lug whereby the interval at which said tripping member shall actuate said dropping device is determined.

4. In a seed planter a wheeled carriage, a frame, mounted thereon, a grain dropping device mounted upon said frame, a tripping member loosely and adjustably mounted upon the axle of said carriage adjacent to a wheel, means for connecting the said tripping member with said axle to rotate therewith, means for disconnecting said tripping member from said axle, projections arranged upon the circumference of said wheel, a spring mounted rod carried by said tripping member adapted to engage with any preferred projection, whereby the position of said tripping member upon the circumference of said wheel is determined and whereby the interval at which said tripping means shall be actuated by said tripping member is fixed.

5. In a seed planter, a wheeled carriage having a frame mounted thereon, a grain dropping device mounted on said frame, a tripping member mounted upon the axle of said carriage adjacent to a wheel, spring controlled means for connecting said tripping member with said axle to be rotated thereby, a lever for disconnecting said tripping member from said axle, a series of projections upon the inner face of the rim of the said wheel, spring controlled means for connecting said tripping member with a preferred projection, said lever being also adapted to disconnect said tripping member from said projection.

In testimony whereof I affix my signature in the presence of two witnesses.

VERNON F. PAVEY.

Witnesses:
I. E. DAVIS,
C. E. PAVEY.